United States Patent
Chen et al.

(10) Patent No.: US 12,116,306 B2
(45) Date of Patent: Oct. 15, 2024

(54) GLASS CERAMICS, AND PRODUCTION METHOD AND DEDICATED DEVICE THEREFOR

(71) Applicant: Qinhuangdao Glass Industry Research and Design Institute Company Limited, Qinhuangdao (CN)

(72) Inventors: Fu Chen, Qinhuangdao (CN); Xinru Xu, Qinhuangdao (CN); Chengxiong Liu, Qinhuangdao (CN); Jianye Feng, Qinhuangdao (CN)

(73) Assignee: Qinhuangdao Glass Industry Research and Design Institute Company Limited (CN)

( * ) Notice: Subject to any disclaimer, the term of this patent is extended or adjusted under 35 U.S.C. 154(b) by 387 days.

(21) Appl. No.: 17/411,908

(22) Filed: Aug. 25, 2021

(65) Prior Publication Data

US 2021/0387900 A1  Dec. 16, 2021

Related U.S. Application Data

(63) Continuation of application No. PCT/CN2020/076571, filed on Feb. 25, 2020.

(30) Foreign Application Priority Data

Feb. 25, 2019  (CN) .......................... 201910137180.0
Feb. 25, 2019  (CN) .......................... 201920236937.7

(51) Int. Cl.
*C03C 10/00* (2006.01)
*C03B 32/02* (2006.01)
(Continued)

(52) U.S. Cl.
CPC .......... *C03C 10/0045* (2013.01); *C03B 32/02* (2013.01); *C03C 10/16* (2013.01); *C03B 18/00* (2013.01); *C03C 2204/00* (2013.01)

(58) Field of Classification Search
CPC . C03C 10/0045; C03C 10/16; C03C 2204/00; C03C 3/112; C03B 32/02; C03B 18/00
See application file for complete search history.

(56) References Cited

U.S. PATENT DOCUMENTS

| | | | | |
|---|---|---|---|---|
| 4,360,567 A | * | 11/1982 | Guillevic | ............... C03C 10/00 501/8 |
| 2016/0102010 A1 | | 4/2016 | Beall et al. | |
| 2017/0233287 A1 | * | 8/2017 | Li | ........................... C03C 3/089 428/172 |

FOREIGN PATENT DOCUMENTS

| | | |
|---|---|---|
| CN | 103771712 A | 5/2014 |
| CN | 104743884 A | 7/2015 |

(Continued)

OTHER PUBLICATIONS

International Preliminary Report on Patentability for Application No. PCT/CN2020/076571 submitted Dec. 25, 2020, pp. 1-7.

(Continued)

*Primary Examiner* — Bryan D. Ripa
*Assistant Examiner* — Cameron K Miller
(74) *Attorney, Agent, or Firm* — Lerner David LLP (57) ABSTRACT

The present invention discloses glass ceramics, and a production method and a dedicated device therefor. Glass ceramics are prepared by using tantalum-niobium tailings, blind mining of natural stone material is greatly reduced, and comprehensive utilization efficiency of tantalum-niobium tailings is improved. The glass ceramics obtained by the production method and the dedicated device has few bubbles and high strength, and the yield and the quality of the finished product are both improved. Moreover, the idle tantalum-niobium tailings are utilized in the production, so that resources are saved.

9 Claims, 1 Drawing Sheet

(51) Int. Cl.
*C03C 10/16* (2006.01)
*C03B 18/00* (2006.01)

(56) References Cited

FOREIGN PATENT DOCUMENTS

| CN | 106746681 A | 5/2017 |
| CN | 109704583 A | 5/2019 |
| CN | 209685571 U | 11/2019 |

OTHER PUBLICATIONS

International Search Report for PCT/CN2020/076571 mailed May 21, 2020; 2 pages.

* cited by examiner

GLASS CERAMICS, AND PRODUCTION METHOD AND DEDICATED DEVICE THEREFOR

CROSS-REFERENCE TO RELATED APPLICATIONS

The present application is a continuation of International application No. PCT/CN2020/076571, filed Feb. 25, 2020, which claims priorities from Chinese Patent Applications 201910137180.0 and 201920236937.7 both filed on Feb. 25, 2019, all of which are hereby incorporated herein by reference.

FIELD OF THE INVENTION

The invention relates to the technical field of glass processing, particularly to a glass ceramics, a production method for the glass ceramics, and a dedicated device for producing the glass ceramics.

BACKGROUND OF THE INVENTION

Glass ceramics is a kind of glass with natural inorganic materials as the main raw material. The glass adopts a certain controlled nucleation and crystallization process, such that a special microcrystalline phase is precipitated in the molten glass with special compositions, with its elementary composition referring to Table 1.

TABLE 1

| Elementary composition of glass-ceramic | | | | | |
|---|---|---|---|---|---|
| component | CaO | $Al_2O_3$ | $SiO_2$ | $Sb_2O_3$ | ZnO + MgO | $Na_2O$ |
| content/% | 16-22 | 3-10 | 50-70 | 1-3 | 4-9 | 1-6 |

Glass ceramics have the triple advantages of glass, ceramics and natural stones, such as the optical passability and surface optical properties of glass, the mechanical and surface crystallization properties of ceramics, the surface anisotropy and decorative properties of natural stones, etc. It is better than natural stones and ceramics, and its performances comparison is shown in Table 2.

TABLE 2

Comparison of various performances of glass ceramics, ceramics and natural stones

| Performance | Ceramic tile | Natural stones | | Glass ceramics |
|---|---|---|---|---|
| | | Granite | Marble | |
| Volume weight (g/cm³) | 2.3-2.4 | 2.5-2.7 | 2.6-2.7 | 2.7 |
| Compressive strength (MPa) | 25-40 | 120-250 | 70-110 | around 300 |
| Bending strength (MPa) | 24-30 | 8.5-15 | 6-16 | 35-105 |
| Impact toughness (KJ/m³) | 2-3 | 2-3 | 2-3 | 2-3 |
| Wearing resistance (k/m²) | 0.23-0.36 | 0.1 | 0.2-0.3 | 0.1 |
| Moh's hardness | 6.5 | 8.0 | 6.0 | 5-7 |
| Finish | 60-70 | 75-85 | 70-80 | 80-90 |
| Water absorption Rate (%) | 4-18 | 0.5-0.8 | 1.0 | <0.02 |
| Cold resistance (%) | >0.5 | 0.25 | 0.23 | 0.028 |
| Acid resistance (%) | 80-85 | <85 | <80 | >92 |
| Alkali resistance (%) | 84 | <80 | <70 | >95 |

It can be seen from Table 2 that the performance of glass ceramics, such as dimensional stability rate (reflected by the water absorption rate, because the water absorption rate is related to the coefficient of thermal expansion, while materials with large water absorption rates are easy to deform, that is, the coefficient of thermal expansion is large and the dimensional stability is low), cold resistance, durability of gloss (that is, cold resistance and durability of materials, reflected by acid resistance and alkali resistance in Table 2), strength (reflected by bending strength and compressive strength), etc, are better than those of ceramics and natural marble and granite. Therefore, glass ceramics can be used as decorative materials for interior and exterior walls and floors of various buildings, and it is also an ideal material for vanity and sanitary countertops. Besides being used for high-end building exterior walls and interior decorations, glass ceramics can also be used for mechanical structures materials, such as insulation materials for electronics and electrical engineering, substrate materials for large-scale integrated circuits, heat-resistant utensils for microwave ovens, chemical and anti-corrosion materials, and mine wear-resistant materials, etc. The glass ceramics are extremely versatile.

Sintering method is the mainly existing production process for glass ceramics and is melted and sintered twice. The sintering method includes the molten water quenching sintering method and the direct sintering method. The molten water quenching sintering method could be described as following. The glass is quenched into small particles using water, and then the particles are put into a mold for nucleation and crystallization. The specific procedures include: mixture preparation→glass melting→water quenching to prepare granules→forming→controlled crystallization-→cold working, etc; the direct sintering process includes: mixture preparation→grinding and mixing→forming and sintering→cold working, etc.

CN 1868946A discloses a waste residue glass ceramics and its preparation method. The preparation method of the glass ceramics is the molten water quenching sintering method of the sintering method. This method not only keeps the energy consumption high, but also makes the densification depth (that is, the thickness of the formed microcrystalline layer) of the produced glass ceramic surface layer shallower than the direct sintering method by about 2 nm. The thinner the thickness of the microcrystalline layer is, the less insufficient microcrystalline is and the worse each performance of the obtained glass ceramics is. The bubbles between the glass particles are difficult to remove, resulting in rough surface, high porosity, and easy deformation. The high temperature resistance, pressure resistance and deformation resistance of the refractory mold used in subsequent molding are highly required, and processes such as secondary processing of the surface of the glass ceramics are also required. The secondary processing will further increase the production energy consumption and cost of the glass ceramics. Because the simultaneous use of magnesium oxide and calcium oxide can be beneficial to the adjustment of the viscosity and temperature performance of the glass, and the glass-ceramic does not use magnesium oxide, and uses a high content of calcium oxide, resulting to the glass brittle. In order to solve this problem, the relatively high-cost boron oxide is used to adjust the glass melting temperature and promote the melting of the glass ceramics, but the production cost of the glass ceramics increases.

When the direct sintering method is used to prepare glass ceramics, the crystal phase ratio depends on the entire devitrification ability of the base glass. As a result, devitrification process is difficult to control, leading a long duration of entire devitrification, low production efficiency and yield.

Currently, the calendering method can also be used to produce glass ceramics. CN 106746681A discloses a glass ceramics with wearing resistance prepared by industrial wastes. The glass ceramics is prepared by a calendering method, whose preparation process includes mixture preparation→glass melting→calendering molding→annealing→nucleation and crystallization→cold working, etc. The calendering method uses double rollers to rotate forward to press the glass to form. The glass shrinks during forming. At the same time, the surface of the roller is rough which results in that the glass surface is not smooth. Therefore, a polishing process is also required after forming, which increases the process flow and reduces the yield, thereby increases the cost. The raw material composition of the glass ceramics contains copper sulfate, nickel sulfide, and magnesium diboride. The chromium trioxide is used for crystallization as nucleating agent. Copper sulfate will color the glass blue, and Cr3+ in Cr2O3 is a heavy metal ion, which will cause chromium pollution and poisoning. It is not safe and environmentally friendly and should be avoided in industry.

SUMMARY OF THE INVENTION

The purpose of the present invention is to address the technical defects existing in the prior art. In the first aspect, it provides a bubble-free glass-ceramic, its elementary composition comprises, on a mass percentage basis, $SiO_2$ 43%-49.8%, $Al_2O_3$ 10.2%-16%, CaO 5.5%-9.9%, MgO 1.2%-9.8%, $Na_2O$ 3.1%-6.5%, $K_2O$ 2.3%-7.7%, BaO 4.2%-8.8%, ZnO 4.5%-10%, $Sb_2O_3$ 0.2%-2%, nitrate radical (preferable $NaNO_3$ and/or $KNO_3$) 0.8%-8%, $P_2O_5$ 0.3%-1.8%, $ZrO_2$ 0.2%-1.5% fluoride ion (preferable $CaF_2$ and/or $Na_2SiF_6$) 0.1%-0.7% and $TiO_2$ 0.7%-3.5%.

The elementary composition comprises, on a mass percentage basis, $SiO_2$ 45%-47%, $Al_2O_3$ 11%-14%, CaO 6%-8%, MgO 3%-8%, $Na_2O$ 4%-5%, $K_2O$ 3%-6%, BaO 5%-7%, ZnO 5%-8%, $Sb_2O_3$ 0.5%-1.5%, nitrate radical 2%-6%, $P_2O_5$ 0.6%-1.5%, $ZrO_2$ 0.5%-1.1%, fluoride ion 0.2%-0.5%, $TiO_2$ 1.2%-2.9%; preferably comprises: $SiO_2$ 46%, $Al_2O_3$ 12.5%, CaO 7%, MgO 5.5%, $Na_2O$ 4.5%, $K_2O$ 4.5%, BaO 6%, ZnO 6.5%, $Sb_2O_3$ 0.8%, nitrate radical 2.8%, $P_2O_5$ 0.8%, $ZrO_2$ 0.7%, fluoride ion 0.4%, $TiO_2$ 2%.

It is made by melting glass raw materials, and the raw materials mainly include tantalum-niobium tailings.

The addition amount of the tantalum-niobium tailings is 25%-40%, preferably 30%-35%, more preferably 33% of the total mass of the raw materials.

In the second aspect, the present invention provides a production method for the above-mentioned glass ceramics, sequentially comprises following steps: mixing raw materials, melting and clarifying mixed raw materials into molten glass, homogenizing and cooling the molten glass, forming the molten glass into glass ribbons, nucleating the glass ribbons, crystallizing the glass ribbons and annealing, etc;

the molten glass is formed into glass ribbons by float process in a forming tin bath, the nucleating the glass ribbons is prime transitional cooling and then nucleating, the crystallizing the glass ribbons is secondary transitional heating and then crystallizing.

The prime transitional cooling and then nucleating specifically is:

the temperature of the glass ribbons obtained in the forming tin bath is adjusted to 600-660° C., then the glass ribbons is put into a nucleation tin bath for nucleating under 580-640° C. for 30 min-3 h to obtain a prime transitional product.

The secondary transitional heating and then crystallizing specifically is:

the temperature of the primary transitional product is adjusted to 740-950° C., then the primary transitional product is put into a crystallization tin bath for crystallizing under 730-940° C. for 2-8.5 h to obtain a secondary transitional product.

The forming the molten glass into glass ribbons specifically is:

the molten glass after homogenizing and cooling is put into the forming tin bath, and is formed into glass ribbons with a thickness of 2-15 mm under the action of the edge puller, the inlet temperature of the forming tin bath is 1250-1320° C., the temperature of the forming tin bath is 750-930° C. when the forming is completed.

Before the raw materials are mixed, the tantalum-niobium tailings is pretreated sequentially through the steps of screening, scrubbing, magnetic separating, pickling and so on, to obtain tantalum-niobium tailings with $Fe_2O_3$ content less than 0.01% (100 ppm) and water content less than 5%, with particle size of the tailings 0.1-1.5 mm.

The melting and clarifying specifically is that the mixed raw materials are melted into molten glass at 1600-1660° C. until no more bubble comes out, the homogenizing and cooling the molten glass specifically is that the temperature of molten glass is kept at 1620-1670° C. until the molten glass is mixed evenly The annealing specifically is that the secondary transitional product is annealed continuously at 600-700° C. for 2-8 hours, or until the temperature of the product is below 100° C., to obtain the glass ceramics.

In the third aspect, the present invention provides a dedicated device for producing a glass ceramics, comprises:
a glass melting furnace, used to mix and melt glass raw materials into molten glass and clarify it,
a cooling pool, used to homogenize and cool the clarified molten glass,
a forming tin bath containing molten tin, used to form molten glass into glass ribbons by float process,
a nucleation tin bath containing molten tin, used for nucleating the glass ribbons,
a crystallization tin bath containing molten tin, used to crystallize the glass ribbons, and
an annealing furnace, used to relieve the stress of the glass ribbons,
which are sequentially connected.

A first transition roller table is set between the forming tin bath and the nucleation tin bath, which is used to adjust the temperature of the glass ribbons for nucleating and transport them to the nucleation tin bath.

A second transition roller table is set between the nucleation tin bath and the crystallization tin bath, which is used to adjust the temperature of the glass ribbons for crystallizing and transport them to the crystallization tin bath.

A plurality of pairs of edge pullers are set symmetrical on the two sides of the forming tin bath.

The number of pairs of edge pullers is 6-12.

No edge puller is provided on any side of the nucleation tin bath and the crystallization tin bath.

Several gas inlets for filling protective gas are provided in the forming tin bath, the nucleation tin bath, and the crystallization tin bath to avoid oxidation of molten tin; wherein the protective gas is nitrogen and hydrogen.

The rollers in the first transition roller table and the second transition roller table are quartz ceramic rollers.

The glass melting furnace is an oxygen-fuel combustion glass melting furnace.

The glass melting furnace is provided with 5-8 pairs of oxygen-fuel combustion spray guns.

Compared with the prior art, the present invention adopts a float process to prepare glass ceramics. Compared with glass ceramics prepared by the current sintering method, the glass ceramics prepared by the present invention has better indicators, such as impact toughness, compressive strength, water absorption rate (i.e., dimensional stability), etc. The physical and chemical properties and decorative effects can reach the level of glass ceramics prepared by the current sintering method. At the same time, the invention uses discarded tantalum-niobium tailings to prepare glass ceramics. The comprehensive utilization efficiency of tantalum-niobium tailings is improved, resources are saved, and the waste is turned into treasure. The tantalum-niobium tailings containing fusible oxides such as $K_2O$, $Na_2O$, $Rb_2O$, PbO and $Li_2O$ produce a eutectic effect, which can lower the melting temperature and reduce the energy consumption in the production of glass ceramics.

In the process of preparing glass ceramics, the present invention uses oxygen-fuel combustion technology to melt the glass raw materials into molten glass, which can speed up the process of melting and clarifying the molten glass, which is beneficial to reduce the generation of bubbles and streaks in the glass, and reduce the internal and surface defects of glass.

In addition, the forming process in the present invention is a two-times forming process. Firstly, the molten glass is formed in a tin bath to a uniform, flat, plate-shaped glass transitional product with a certain thickness and width. After adjusting the temperature of the transitional product outside the tin bath, the transitional product enters a tin bath again for nucleation and crystallization. The obtained glass ceramics have fewer bubbles, high strength. The yield and quality of the finished products have been greatly improved.

1 glass melting furnace, 2 molten glass, 3 cooling pool, 4 upper space, 5 forming tin bath, 6 glass ribbon, 7 first transition roller table, 8 rollers, 9 nucleation tin bath, 10 second transition roller table, 11 crystallization tin bath, 12 curtain, 13 annealing furnace, 14 oxy-fuel combustion spray gun, 15 molten tin, 16 edge puller.

DETAILED DESCRIPTION OF THE EMBODIMENTS

Tantalum-niobium tailings are the remaining tailings after selecting tantalum and niobium from lithium feldspar minerals containing rare metals of tantalum and niobium. If tantalum-niobium tailings are not used rationally, the pollution to the environment will be deteriorated more and more in the future, which is an urgent problem to be solved.

According to the beneficiation analysis, the content of Al2O3 in the tantalum-niobium tailings is relatively high; thus, tantalum-niobium tailings can be introduced into the preparation of glass ceramics for architectural decoration to provide the Al2O3 required for the preparation of glass ceramics. At the same time, a small amount of Na2O can be introduced to reduce the of soda ash used. Partial addition of P2O5, ZrO2, fluoride and TiO2 can be use as nucleating agents to reduce the amount of nucleating agents and is helpful to reduce the cost of glass production. As is seen, it can fully utilize industrial wastes to prepare glass ceramic by using tantalum-niobium tailings. Therefore, the present invention provides a technology for producing glass ceramics by using tantalum-niobium tailings as the main raw material via float process.

The glass ceramics in the present invention is made by melting uniformly mixed raw materials of glass ceramics and tantalum-niobium tailings. The raw materials contain silica sand (as industrial counterpart of $SiO_2$), feldspar (as industrial counterpart of $Al_2O_3$), limestone (as industrial counterpart of CaO), magnesite (as industrial counterpart of MgO), soda ash (as industrial counterpart of $Na_2O$), potassium carbonate (as industrial counterpart of $K_2O$). The antimony trioxide ($Sb_2O_3$) and nitrate (generally sodium nitrate and potassium nitrate are used) can be added to the glass raw material as a glass fining agent.

In the present invention, tantalum-niobium tailings have been determined to produce glass ceramics for architectural decoration through a large number of studies. Elementary composition in the glass ceramics comprises, on a mass percentage basis: $SiO_2$ 43 wt %-49.8 wt %, $Al_2O_3$ 10.2 wt %-16 wt %, CaO 5.5 wt %-9.9 wt %, MgO 1.2 wt %-9.8 wt %, $Na_2O$ 3.1 wt %-6.5 wt %, $K_2O$ 2.3 wt %-7.7 wt %, BaO 4.2 wt %-8.8 wt %, ZnO 4.5 wt %-10 wt %, $Sb_2O_3$ 0.2 wt %-2 wt %, nitrate radical 0.8 wt %-8 wt %, $P_2O_5$ 0.3 wt %-1.8 wt %, $ZrO_2$ 0.2 wt %-1.5 wt %, fluoride ion 0.1 wt %-0.7 wt % and $TiO_2$ 0.7 wt %-3.5 wt %, wherein $P_2O_5$, $ZrO_2$, fluoride and $TiO_2$ are used as complex crystal nucleating agents;

Preferably:
$SiO_2$ 45%-47%, $Al_2O_3$ 11%-14%, CaO 6%-8%, MgO 3%-8%, $Na_2O$ 4%-5%, $K_2O$ 3%-6%, BaO 5%-7%, ZnO 5%-8%, $Sb_2O_3$ 0.5%-1.5%, nitrate radical 2%-6%, $P_2O_5$ 0.6%-1.5%, $ZrO_2$ 0.5%-1.1%, fluoride ion 0.2%-0.5%, $TiO_2$ 1.2%-2.9%.

More preferably:
$SiO_2$ 46%, $Al_2O_3$ 12.5%, CaO 7%, MgO 5.5%, $Na_2O$ 4.5%, $K_2O$ 4.5%, BaO 6%, ZnO 6.5%, $Sb_2O_3$ 0.8%, nitrate radical 2.8%, $P_2O_5$ 0.8%, $ZrO_2$ 0.7%, fluoride ion 0.4%, $TiO_2$ 2%.

Among the raw materials for the production of glass ceramics, the optimal addition of the tantalum-niobium tailings is 25%-40%, preferably 30%-35%, more preferably 33% of the total mass of the raw materials. This addition ratio can maximize the use of tantalum-niobium tailings while ensuring the stability of the glass-ceramic composition. At the same time, some trace elements contained in the tailings, such as $Li_2O$, $Rb_2O$, PbO, NiO, etc, are also beneficial to the melting and clarifying of glass.

The above raw materials for glass production are all commercially available. Among them, in the present invention, tantalum-niobium tailings are used. These tantalum-niobium tailings generally contain multiple elements, and its composition is relatively fixed. The tantalum-niobium tailings selected in the present invention need to contain $SiO_2$, $Li_2O$, $Rb_2O$, PbO, NiO, $Na_2O$, $P_2O_5$, $ZrO_2$, fluoride and $TiO_2$. For example, in the embodiments of the present invention, tantalum-niobium tailings containing the following substances are selected, but the specific implementation is not limited to the composition and source:

The tantalum-niobium tailings that can be used in the present invention are confirmed through the beneficiation test, wherein the chemical compositions are shown in Table 3.

TABLE 3

Chemical composition of tantalum-niobium tailing after beneficiation test

| Elementary composition | $SiO_2$ | $Al_2O_3$ | $Fe_2O_3$ | CaO | MgO | $K_2O$ | $Na_2O$ |
|---|---|---|---|---|---|---|---|
| Content (wt %) | 72.67 | 16.19 | 0.045 | 0.38 | 0.056 | 2.82 | 5.01 |
| Elementary composition | $Ta_2O_5$ | $Nb_2O_5$ | $TiO_2$ | $Rb_2O$ | Fluorides ion | $P_2O_5$ | Ignition loss IL (wt %) |
| Content (wt %) | 0.011 | 0.0022 | 0.011 | 0.25 | 1.98 | 0.48 | |
| Elementary composition | $Li_2O$ | MnO | PbO | $ZrO_2$ | NiO | ZnO | 0.26 |
| Content (wt %) | 0.54 | 0.072 | 0.0012 | 0.0002 | 0.0027 | 0.0095 | |

The present invention uses the float method to produce glass ceramics. The procedure is as followed. The molten glass is flowed into a forming tin bath for forming. After that, it sequentially enters a nucleation tin bath and a crystallization tin bath for nucleation and crystallization, respectively. After gradually cooling in the crystallization tin bath, it enters the annealing furnace for annealing to eliminate the stress of the glass. During annealing, the glass ribbon is heated, soaked, thermal insulated, slowly cooled and rapidly cooled, etc according to a certain temperature curve, so that the internal stress value produced during the forming and cooling process is reduced to meet the criterion of cutting and quality requirements.

Although the present invention uses the float method to produce glass ceramics, it is not similar to the float method of ordinary glass. The common glass float production process is to make the molten glass flow into the tin bath to form, and after forming, it is cooled by passing the transition roller table, and then enters the annealing furnace for annealing.

The glass ceramics of the present invention is prepared by the float process. Hence, it can also be called float glass ceramics, which is made of natural inorganic materials through crushing, batching, melting, float forming, crystallization, annealing and other processes. The float glass ceramics has the excellent characteristics of glass ceramics obtained by sintering method, such as no radiation, no water absorption, no corrosion, no oxidation, no fading, no color difference, no deformation, high strength, high gloss, etc. Further, it additionally has the advantages of no bubbles, natural and beautiful patterns, better physical and chemical properties, ultra-thin and ultra-wide of product specifications, no pores, easy cleaning, large output, high yield, and low cost, etc. The float glass ceramics can be used as high-level building decoration materials, with very good flatness, surface gloss and excellent physical and chemical properties, which can replace natural granite and be used for interior and exterior wall, floor and countertop decoration of various buildings. Float glass ceramics has been widely promoted and applied with its advantages of high-performance quality, low production cost, and large-scale production. In addition, industrial waste residue can be used as the main raw material in the production of float glass ceramics (such as: tantalum-niobium tailings, gold tailings, etc), which is an environmental friendly project and is also the first choice for float glass companies to improve economic efficiency.

After a large number of experiments and repeated studies, the elementary composition in glass ceramics of the present invention is finally selected and includes $SiO_2$, $Al_2O_3$, CaO, MgO, $Na_2O$, $K_2O$, ZnO, etc. The main components of glass and the roles they play in high-strength glass ceramics are as follows:

Silica $SiO_2$ is a main body of glass-forming framework. $SiO_2$ in sodium calcium silicate glass can reduce the coefficient of thermal expansion of glass and improve the thermal stability, chemical stability, softening temperature, hardness and mechanical strength of glass.

Alumina $Al_2O_3$ is an intermediate oxide in glass. It could reduce the crystallization tendency of glass, improving the chemical stability, thermal stability, mechanical strength, hardness and refractive index of glass, and reduce the corrosion of glass to refractory materials. The content of $Al_2O_3$ in the glass ceramics of the present invention is 10.2%-16%, while the content of $Al_2O_3$ in the ordinary glass ceramics does not exceed 10%. This is because it is discovered in the present invention that two structures of $[AlO_4]$ and $[AlO_6]$ exist in the glass ceramics when the content of alumina is high, which needs low requirements on environmental parameters in the direct application and deep processing, and helps glass to be tempered chemically and promoted and applied in a large area.

Sodium oxide $Na_2O$ is an oxide of network external body in glass, and can reduce the viscosity of glass and make glass easy to melt, which is a good flux for glass. $Na_2O$ can reduce the coefficient of thermal expansion of glass and increase the thermal stability, chemical stability and mechanical strength of glass.

Potassium oxide $K_2O$ is also an oxide of network external body in glass, and its role in glass is similar to that of $Na_2O$. The radius of potassium ion (K+) is larger than that of sodium ion (Na+). The viscosity of glass containing potassium is larger than that of glass containing sodium, which can reduce the devitrification tendency of glass and increase the transparency and gloss of glass, etc. It can also produce mixed alkali effect with $Na_2O$, which is conducive to the melting of glass.

Calcium oxide CaO is a divalent oxide of network external body in glass and is mainly used as a stabilizer, that is, it can increase the chemical stability and mechanical strength of glass. When its content is high, it will increase the crystallization tendency of glass.

Magnesium oxide MgO is an oxide of network external body in sodium calcium silicate glass. Part of CaO is replaced with less than 10% MgO in glass which can slow down the hardening speed of glass, reduce the devitrification tendency of glass, and improve the chemical stability and mechanical strength of glass.

Barium oxide BaO is also an oxide of network external body in glass, which can increase the refractive index, density, gloss and chemical stability of glass, and can also lengthen the material properties of glass. A small amount of barium oxide can also accelerate the melting and devitrification of glass.

Zinc oxide ZnO is an intermediate oxide in glass. It could make the glass structure more compact and reduce the coefficient of thermal expansion of the glass. It also could improve the thermal and chemical stability of glass and increase the refractive index of glass. It also could accelerate the melting, phase separation and devitrification of glass at high temperatures.

Phosphorus pentoxide $P_2O_5$ is a glass-forming oxide. It forms a network structure of phosphate glass with phosphorous oxygen tetrahedron $[PO_4]$. It could improve coefficient of dispersion of glass and the ability to pass ultraviolet rays. It could be used as a nucleating agent in the preparation of glass ceramics.

Zirconium dioxide $ZrO_2$ is an intermediate oxide. It could improve the viscosity, hardness, elasticity, refractive index, and chemical stability of glass. It could reduce coefficient of thermal expansion of glass. It can be used as a nucleating agent for glass ceramics.

Fluoride is a commonly used flux and opacifier in glass industry, which can also be used as a nucleating agent for glass ceramics. $CaF_2$ and $Na_2SiF_6$ are mainly used.

Titanium dioxide $TiO_2$ is an intermediate oxide. It could improve the refractive index and chemical stability of glass, increase the ability to absorb X-rays and ultraviolet rays. It could be used as a nucleating agent for aluminosilicate glass ceramics.

The process of heating the batch materials to form uniform, bubble-free molten glass that meets the forming requirements is called glass melting. The glass melting process is an important step in glass production. Many defects of glass (such as bubbles, stones, streaks, etc) are caused by the unevenness of the molten glass during the melting process. The output, quality, qualification rate, production cost, fuel consumption and furnace life for melting are closely related to the glass melting process. Therefore, a reasonable glass melting process is an important guarantee to proceed the entire production process smoothly and produce high-quality glass products efficiently.

During the glass melting process, due to the decomposition of the various components in the batch material and the volatilization of the volatile components, a large amount of gas is produced. There is still a small part of the gas that cannot completely escape from molten glass and remain in molten glass in the form of bubbles until the glass forming process is completed. Therefore, in order to obtain a pure, uniform and high-quality molten glass, antimony trioxide ($Sb_2O_3$) and nitrate (usually sodium nitrate and potassium nitrate) are added to glass batch materials as clarifying agents to promote the emission of bubbles in the molten glass. Compared with the currently commonly used clarifiers sulfate, the present invention selects $Sb_2O_3$ and nitrate as clarifiers, which will not produce sulfate secondary bubbles, and at the same time will not produce pollutant $SO_2$ in the flue gas. It is beneficial to reduce the load of flue gas desulfurization and denitration, thereby it can reduce the production cost of glass ceramics. At the same time, nano titanium dioxide ($TiO_2$), phosphorus pentoxide ($P_2O_5$), fluoride and nano zirconium dioxide ($ZrO_2$) is added as nucleating agents into the glass raw materials in the present invention, which can accelerate the nucleation and crystallization of glass and speed up the formation and growth of crystallites which means these nucleating agents can accelerate the transition process from glass to crystal and gather the surrounding tiny particles together, thereby promote the emission of bubbles in molten glass.

The present invention adopts tantalum-niobium tailings as the main raw materials and uses the float process to produce glass ceramics, whose impact strength, compressive strength and other indexes are better than those obtained by the sintering method. However, due to the high content of $Al_2O_3$ in the composition of the glass ceramics of the present invention, there are two technical problems when conventional float glass production is used to product glass ceramics: one is that the high melting temperature of the glass makes difficult to clarify and homogenize. The other is that it is difficult to control microcrystallization, and the reasons is that the difference between the melting temperature and the forming temperature is large when float process used to produce glass ceramics, and the temperatures of nucleation and crystallization are so different that they are difficult to control in tin bath. For the first problem, the oxygen-fuel combustion technology is adopted to reduce the viscosity of the molten glass in the present invention, and the problem of difficulty in clarification and homogenization are solved. At the same time, the bubbles, blubs and streaks in the molten glass are reduced. For the second problem, in the present invention, $P_2O_5$, $ZrO_2$, fluoride and $TiO_2$ and other crystal nucleating agents are added into the tantalum-niobium tailings, and the molten glass is formed into a tin bath firstly; and formed glass leaves the tin bath to the transition roller table to adjust the temperature after forming and then enters tin baths again for nucleation and crystallization, which make the microcrystallization process controllable, prevent defects and ensure the stability of the crystallization process. The goals of continuous production, high efficiency, and low cost are achieved, and qualified glass ceramics for architectural decoration is obtained.

Tantalum-niobium tailings are used as raw materials to prepare float glass ceramics in the present invention. The prepared glass has stable performance and wide application. It is beneficial to the application and promotion of this variety of glass ceramics, and can accelerate the comprehensive utilization of tantalum-niobium tailings, reduce pollution to the environment.

Figure 1:
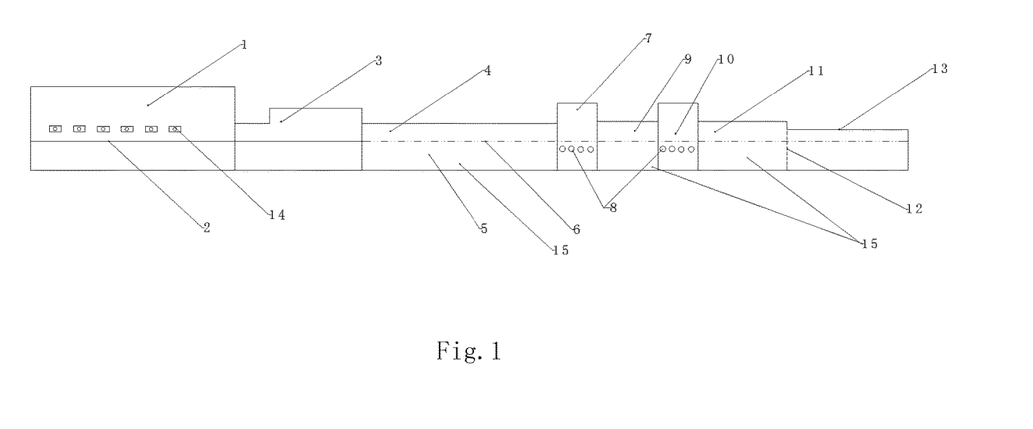
FIG. 1 shows a longitudinal sectional view of the structure of the dedicated device for producing glass ceramics according to the present invention.
Figure 2:
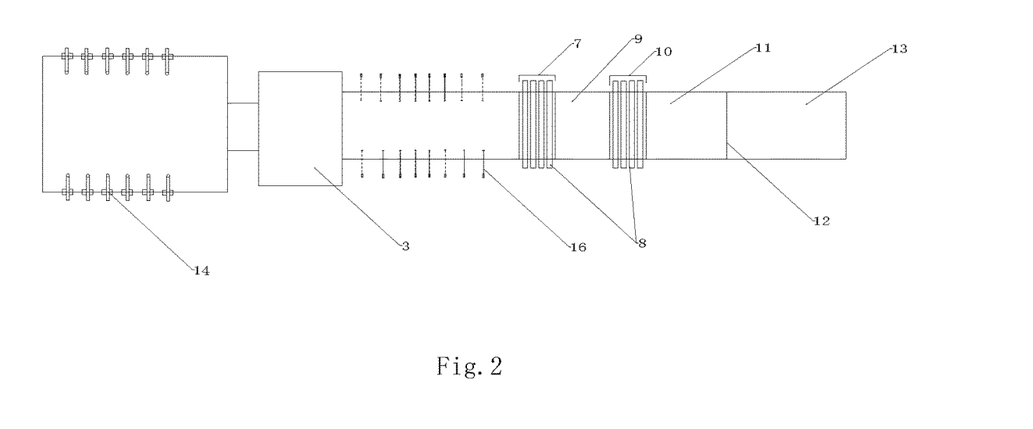
FIG. 2 shows a top view of the structure of the dedicated device for producing glass ceramics according to the present invention.

The present invention further provides a dedicated device for producing the glass ceramics, as shown in FIG. 1 and FIG. 2. The device comprises a glass melting furnace 1, a cooling pool 3, a forming tin bath 5, a first transition roller table 7, a nucleation tin bath 9, a second transition roller table 10, a crystallization tin bath for 11, and an annealing furnace 13, which are connected sequentially.

The glass melting furnace 1 is used to melt the mixed glass raw materials into molten glass 2 and remove visible bubbles in the molten glass. The process of removing visible bubbles was called clarification of molten glass, that is, both the melting of glass raw materials and the clarification of molten glass are performed in the glass melting furnace 1.

The cooling pool 3 is used to homogenize and cool the clarified molten glass, and adjust the viscosity of the molten glass, that is, to mix the molten glass raw material uniformly, adjust the viscosity of the molten glass, and cool the molten glass to the forming temperature, which provide a guarantee for the subsequent forming of molten glass;

The forming tin bath 5 is used to pull the mixed molten glass into a glass product with a fixed geometric shape. The forming tin bath 5 included 6-12 pairs of edge pullers 16 arranged symmetrically in pairs on both sides of the forming tin bath. The molten glass 2 floats on the molten tin 15 after entering the forming tin bath 5. Under the pulling force of the edge pullers 16 symmetrically arranged on both sides of the forming tin bath 5, the molten glass 2 is drawn into a glass ribbon 6, then the forming is complete.

The first transition roller table 7 is used to adjust the temperature of the formed glass ribbon 6 to 600-660° C. and then transport it to the nucleation tin bath 9. The roller 8 in the first transition roller table 7 was made of quartz ceramic.

Molten tin 15 is contained in the nucleation tin bath 9. The glass ribbon 6 enters and floats on the surface of the molten tin 15. The temperature of the glass ribbon 6 is adjusted to 580-640° C. for nucleation by molten tin 15. Different from the forming tin bath, no edge puller 16 is arranged on both sides of the nucleation tin bath 9.

The second transition roller table 10 is used to adjust the temperature of the nucleated glass ribbon 6 to 740-950° C., and then transport it to the crystallization tin bath 11. The roller 8 in the second transition roller table 10 was made of quartz ceramic.

Molten tin 15 is contained in the crystallization tin bath 11. The entered glass ribbon 6 floats on the surface of the molten tin 15. The temperature of the glass ribbon 6 is adjusted to 730-940° C. for crystallization by molten tin 15. Different from the forming tin bath, no edge puller 16 is arranged on both sides of the crystallization tin bath 11.

The upper spaces 4 of the forming tin bath, nucleation tin bath, and crystallization tin bath are filled with nitrogen and hydrogen to prevent oxidation of the molten tin. The nucleation and crystallization of glass will automatically occur when the temperature of glass is adjusted to a certain range. The nucleating agent is evenly mixed with other raw materials when the glass raw material was added, and is uniformly distributed in the molten glass again at high temperature during melting. After reaching the temperature of nucleation and crystallization, the nucleating agent promotes to form the crystal nucleus in the glass and makes the crystal grow. Then the glass ceramics forms.

The annealing furnace 13 is used to eliminate the stress in the formed glass ribbon 6 with a certain thickness, and to continuously reduce the temperature of the glass ribbon to below 100° C. The annealing furnace 13 and the crystallization tin bath 11 are separated by a curtain 12.

The present invention also provided a method to produce the above-mentioned glass ceramics. The process flow includes pretreatment of tantalum-niobium tailings, mixing of raw materials, melting and clarification of molten glass, homogenization of molten glass, forming in a tin bath, a prime transitional cooling and nucleation, a secondary transitional heating and crystallization, annealing, etc. Each step is carried out in the above-mentioned dedicated device for producing glass ceramics, specifically is:

1) Pretreatment of Tantalum-Niobium Tailings:

The tantalum-niobium tailings are sequentially classified, scrubbed, magnetic separation, pickling and other processes to obtain tantalum-niobium tailings which are suitable for the production of glass ceramics. The content of $Fe_2O_3$ in the tantalum-niobium tailings is less than 0.01% (100 ppm), and content of water is less than 5%, the particle size is 0.1-1.5 mm.

2) Mixing of Raw Materials:

After detecting the chemical composition of the tantalum-niobium tailings and calculation, one or more of $SiO_2$, $Al_2O_3$, CaO, MgO, $Na_2O$, $K_2O$, $B_2O_3$, ZnO, $Li_2O$, and MnO are mixed with the tantalum-niobium tailing obtained in step 1) to obtain the glass raw material. The elementary composition in the glass ceramics comprises, on a mass percentage basis in term of, $SiO_2$ 43%-49.8%, $Al_2O_3$ 10.2%-16%, CaO 5.5%-9.9%, MgO 1.2%-9.8%, $Na_2O$ 3.1%-6.5%, $K_2O$ 2.3%-7.7%, BaO 4.2%-8.8%, ZnO 4.5%-10%, $Sb_2O_3$ 0.2%-2%, nitrate radical 0.8%-8%, $P_2O_5$ 0.3%-1.8%, $ZrO_2$ 0.2%-1.5% fluoride ion 0.1%-0.7% and $TiO_2$ 0.7%-3.5%. In general industrial production, $SiO_2$, $Al_2O_3$, CaO, MgO, $Na_2O$, $K_2O$ come from their own industrial counterpart, respectively, such as $SiO_2$ comes from silica sand, $Al_2O_3$ comes from feldspar, CaO comes from limestone, MgO comes from magnesite, $Na_2O$ comes from soda ash, and $K_2O$ comes from potassium carbonate.

The elementary composition preferably comprises $SiO_2$ 45%-47%, $Al_2O_3$ 11%-14%, CaO 6%-8%, MgO 3%-8%, $Na_2O$ 4%-5%, $K_2O$ 3%-6%, BaO 5%-7%, ZnO 5%-8%, $Sb_2O_3$ 0.5%-1.5%, nitrate radical 2%-6%, $P_2O_5$ 0.6%-1.5%, $ZrO_2$ 0.5%-1.1%, fluoride ion 0.2%-0.5%, $TiO_2$ 1.2%-2.9%; more preferably $SiO_2$ 46%, $Al_2O_3$ 12.5%, CaO 7%, MgO 5.5%, $Na_2O$ 4.5%, $K_2O$ 4.5%, BaO 6%, ZnO 6.5%, $Sb_2O_3$ 0.8%, nitrate radical 2.8%, $P_2O_5$ 0.8%, $ZrO_2$ 0.7%, fluoride ion 0.4%, $TiO_2$ 2%.

3) Melting and Clarification of Molten Glass:

The mixed glass raw materials obtained in step 2) is melted into molten glass at 1600-1660° C. Generally, it takes about 24 hours. When no more bubbles emerged from the resulting molten glass (generally about 12-25 h was needed for sufficient clarification), clarification is ended.

4) Homogenization and Cooling of Molten Glass:

The temperature of the clarified molten glass is kept at 1620-1670° C. until the chemical composition of the molten glass is uniform (generally 7-16 h). The homogenization is completed. The homogenization is used to eliminate the stripes and uneven body. The molten glass was cooled to 1350-1400° C. in the process of forward flowing;

5) Forming in the Tin Bath:

After homogenization and cooling of Step 4), the molten glass enters the forming tin bath so that the glass was formed uniform, and the flat and plate glass transitional products with a certain thickness and width is obtained. Its thickness is 2-15 mm, and the width generally equals to the width of the tin bath. The inlet temperature of the tin bath is 1250-1320° C. (the forming temperature in the current method is 1050-1100° C.), and the temperature of the tin bath is 750-930° C. after the forming is completed.

6) Prime Transitional Cooling and Nuclearization:

After forming, the transitional products enter the first transition roller table And the temperature is adjusted to 600-660° C. After that, they enter the tin bath again for nucleation. The temperature of nucleation is 580-640° C. and the time of nucleation is 30 min-3$h$, then a prime transitional product is obtained.

7) Secondary Transitional Heating and Crystallization:

The nucleated primary transitional product enters the second transition roll table in order to adjust the temperature to 740-950° C., and then enter the tin bath again for crystallization. The temperature of crystallization is 730-940° C., and the time of crystallization is 2-8.5 h, then secondary transitional product is obtained.

8) Annealing:

The secondary transitional product after crystallization is annealed continuously at 600-700° C. for 2-8 hours or until below 100° C. in order to eliminate the stress of the glass. The glass ceramics of the present invention is obtained.

The above dedicated device for producing glass ceramics and glass raw materials containing tantalum-niobium tailings were used to prepare the glass ceramics of Examples 1 to 7 according to the above method to produce glass ceramics. The parameters and raw material composition of producing the glass ceramics of Examples 1 to 7 are shown in Table 4. At the same time, the glass ceramics of Comparative Example 1 to 4 were prepared according to the above method of producing glass ceramics. The difference was that some parameters and raw material composition of the glass ceramics of Comparative Example 1 to 4 were not in the scope of the present invention. The parameters and raw material composition are also shown in Table 4.

It can be seen that compared with the glass ceramics obtained in comparative examples, the glass ceramics described in the present invention had: 1) lower water absorption rate, indicating that the porosity rate of the glass ceramics of the present invention was lower, moisture absorption was not easy to occur, and the strength was higher because it was not easy to absorb moisture which led to denaturation and strength drop. 2) higher finish, indicating that the surface smoothness of the glass-ceramic in the present invention was high without physical or chemical

TABLE 4

Raw material composition and production parameters of Examples 1-7 glass ceramics

| Parameters | | Examples | | | | | | | Comparative examples | | | |
|---|---|---|---|---|---|---|---|---|---|---|---|---|
| | | 1 | 2 | 3 | 4 | 5 | 6 | 7 | 1 | 2 | 3 | 4 |
| Raw Material Composition | $SiO_2$ | 43 | 49.8 | 45 | 47 | 46 | 43.1 | 44 | 46 | 46 | 46 | 46 |
| | $Al_2O_3$ | 16 | 10.2 | 14 | 11 | 12.5 | 10.2 | 10.3 | 6 | 12.5 | 12.5 | 12.5 |
| | CaO | 9.9 | 5.5 | 8 | 6 | 7 | 5.5 | 7.8 | 9 | 8.5 | 9 | 8.5 |
| | MgO | 9.8 | 1.2 | 3 | 8 | 5.5 | 1.2 | 7.5 | 9.5 | 8.5 | 0 | 8.5 |
| | $Na_2O$ | 3.1 | 6.5 | 4 | 5 | 4.5 | 6.4 | 3.6 | 4.5 | 4.5 | 5.5 | 4.5 |
| | $K_2O$ | 2.3 | 7.7 | 6 | 3 | 4.5 | 7.5 | 5.5 | 4.5 | 0 | 7 | 0 |
| | BaO | 8.8 | 4.2 | 5 | 7 | 6 | 8 | 5.7 | 6.5 | 7.5 | 0 | 7.5 |
| | ZnO | 4.5 | 10 | 8 | 5 | 6.5 | 6.3 | 7 | 6.5 | 7.5 | 8 | 7.5 |
| | $P_2O_5$ | 0.3 | 0.5 | 0.4 | 0.5 | 0.8 | 0.4 | 1.8 | 0.8 | 0.3 | 0 | 0.3 |
| | $ZrO_2$ | 0.2 | 0.5 | 0.7 | 1.2 | 0.7 | 0.3 | 1.5 | 0.7 | 0 | 1.5 | 0 |
| | fluoride ion | 0.2 | 0.5 | 0.4 | 0.1 | 0.4 | 0.1 | 0.7 | 0.4 | 0 | 0 | 0 |
| | $TiO_2$ | 0.9 | 0.8 | 2.5 | 0.7 | 2 | 1 | 3.5 | 2 | 1.5 | 3.5 | 1.5 |
| | $Sb_2O_3$ | 0.2 | 0.6 | 0.8 | 1.5 | 0.8 | 2 | 0.2 | 0.8 | 0.7 | 1.5 | 0.7 |
| | $NaNO_3$ | 0.8 | 2 | 2.2 | 4 | 2.8 | 8 | 0.9 | 2.8 | 2.5 | 5.5 | 2.5 |
| Step 3) Molten Temperature/° C. | | 1660 | 1600 | 1639 | 1613 | 1605 | 1620 | 1630 | 1605 | 1644 | 1630 | 1644 |
| Step 4) Homogenizing Temperature/° C. | | 1660 | 1630 | 1645 | 1650 | 1620 | 1640 | 1670 | 1620 | 1653 | 1642 | 1630 |
| Step 5) Forming Temperature/° C. | | 1310 | 1270 | 1320 | 1260 | 1250 | 1290 | 1280 | 1250 | 1302 | 1288 | 1302 |
| Step 6) Nucleating Temperature/° C. | | 640 | 620 | 590 | 630 | 600 | 580 | 610 | 600 | 656 | 630 | 675 |
| Step 7) Crystallizing Temperature/° C. | | 780 | 880 | 940 | 730 | 800 | 900 | 850 | 800 | 913 | 898 | 966 |

Experiment:

The bending strength of the glass obtained in Examples 1-7 and Comparative Examples 1-4 was measured. The glass samples were cut, ground, and polished into a strip of 80×10×10 mm. The three-point bending method and DKZ-5000 electric flexural testing machine were used in the experiment. The performance test results were shown in Table 5.

polishing, which improved production efficiency and yield, and reduced costs; 3) better acid resistance and alkali resistance, indicating that the glass-ceramic of the present invention had good corrosion resistance and the service life would not be reduced due to external acid and/or alkali corrosion when used; 4) better compressive strength and bending strength, indicating that the internal structure of the glass ceramics in the present invention was denser, the

TABLE 5

Performance test results of Examples 1-7 and Comparative Examples 1-4 glass

| Performance Parameters | | Glass Density g/cm³ | Water Absorption Rate/% | Degree of Finish | Chemical Stability | | | Compressive Strength MPa | Bending strength MPa |
|---|---|---|---|---|---|---|---|---|---|
| | | | | | Water Resistance | Acid Resistance | Alkali Resistance | | |
| Examples | 1 | 2.56 | 0.012 | 83.3 | Medium | High | Medium | 352 | 121 |
| | 2 | 2.5 | 0.01 | 84.4 | Medium | High | Medium | 360 | 133 |
| | 3 | 2.57 | 0.01 | 85.8 | High | High | Medium | 370 | 136 |
| | 4 | 2.48 | 0.008 | 88.5 | High | High | Medium | 376 | 150 |
| | 5 | 2.58 | 0.003 | 90.2 | High | High | High | 382 | 159 |
| | 6 | 2.53 | 0.009 | 86.1 | High | High | Medium | 374 | 141 |
| | 7 | 2.51 | 0.011 | 83.9 | Medium | High | Medium | 355 | 127 |
| Comparative examples | 1 | 2.46 | 0.04 | 71.6 | Medium | Medium | Low | 350 | 118 |
| | 2 | 2.55 | 0.02 | 72.0 | Medium | Medium | Low | 331 | 102 |
| | 3 | 2.56 | 0.033 | 73.6 | Medium | High | Low | 326 | 99 |
| | 4 | 2.55 | 0.02 | 75.5 | Medium | Medium | Low | 312 | 89 | degree of surface microcrystallization was high, and the degree of resistance to external forces was also high, and the application was not limited. The glass ceramic was suitable as a building decoration material that requires high strength, good mechanical processing performance, and could be widely used.

INDUSTRIAL APPLICABILITY

The glass-ceramic and its production method and dedicated device provided by the invention use tantalum-niobium tailings as raw materials to improve the comprehensive utilization efficiency of the tantalum-niobium tailings. The glass ceramics obtained by the method of the invention have fewer bubbles and high strength. The rate and quality of finished products are also improved. The glass ceramics is suitable for industrial applications.

The invention claimed is:

1. A glass ceramic, is produced by a float process using melting raw materials, its elementary composition comprises, on a mass percentage basis, $SiO_2$ 45%-47%, $Al_2O_3$ 11%-14%, CaO 6%-8%, MgO 3%-8%, $Na_2O$ 4%-5%, $K_2O$ 3%-6%, BaO 5%-7%, ZnO 5%-8%, $Sb_2O_3$ 0.5%-1.5%, nitrate radical 2%-6%, $P_2O_5$ 0.6%-1.5%, $ZrO_2$ 0.5%-1.1%, fluoride ion 0.2%-0.5%, $TiO_2$ 1.2%-2.9%.

2. The glass ceramic according to claim 1, wherein, the elementary composition comprises, on a mass percentage basis, $SiO_2$ 46%, $Al_2O_3$ 12.5%, CaO 7%, MgO 5.5%, $Na_2O$ 4.5%, $K_2O$ 4.5%, BaO 6%, ZnO 6.5%, $Sb_2O_3$ 0.8%, nitrate radical 2.8%, $P_2O_5$ 0.8%, $ZrO_2$ 0.7%, fluoride ion 0.4%, $TiO_2$ 2%.

3. The glass ceramic according to claim 1, wherein, the raw materials mainly include tantalum-niobium tailings with particle size 0.1-1.5 mm which contain at least $SiO_2$, $Li_2O$, $Rb_2O$, PbO, NiO, $Na_2O$, $P_2O_5$, $ZrO_2$, fluoride and $TiO_2$, the content of $Fe_2O_3$ and water in the tailings is less than 0.01% (100 ppm) and less than 5%, respectively.

4. The glass ceramic according to claim 3, wherein, the fluoride ion of the composition is supplied by $CaF_2$ and/or $Na_2SiF_6$ when tantalum-niobium tailings cannot be supplied insufficiently, the nitrate radical of the composition is supplied by $NaNO_3$ and/or $KNO_3$ when tantalum-niobium tailings cannot be supplied insufficiently, and oxides of the composition are supplied by their own industrial counterparts when tantalum-niobium tailings cannot be supplied insufficiently.

5. The glass ceramics according to claim 1, which is produced using a dedicated device, wherein,
the dedicated device comprises:
a glass melting furnace, used to mix and melt glass raw materials into molten glass and clarify it,
a cooling pool, used to homogenize and cool the clarified molten glass,
a forming tin bath containing molten tin, used to form molten glass into glass ribbons by float process,
a nucleation tin bath containing molten tin, used to nucleate the glass ribbons,
a crystallization tin bath containing molten tin, used to crystallize the glass ribbons, and
an annealing furnace, used to relieve the stress of the glass ribbons,
which are sequentially connected.

6. The glass ceramic according to claim 5, wherein, a first transition roller table is set between the forming tin bath and the nucleation tin bath, which is used to adjust the temperature of the glass ribbons for nucleating and transport them to the nucleation tin bath; a second transition roller table is set between the nucleation tin bath and the crystallization tin bath, which is used to adjust the temperature of the glass ribbons for crystallizing and transport them to the crystallization tin bath; a plurality of pairs of edge pullers are set symmetrical on the two sides of the forming tin bath, the number of pairs of edge pullers is 6-12, and no edge puller is provided on any side of the nucleation tin bath and the crystallization tin bath; several gas inlets for filling protective gas are provided in the forming tin bath, the nucleation tin bath, and the crystallization tin bath to avoid oxidation of molten tin; wherein the protective gas is nitrogen and/or hydrogen.

7. The glass ceramic according to claim 1, produced by a production method, wherein,
the production method sequentially comprises following steps: mixing raw materials, melting, and clarifying raw materials into molten glass, homogenizing and cooling the molten glass, forming the molten glass into glass ribbons, nucleating the glass ribbons, crystallizing the glass ribbons, and annealing; wherein,
the molten glass is formed into glass ribbons by float process in a forming tin bath, the nucleating the glass ribbons is includes a primary transitional cooling and then nucleating, the crystallizing the glass ribbons includes a secondary transitional heating and then crystallizing.

8. The glass ceramics according to claim 7, wherein, the primary transitional cooling and then nucleating specifically is: the temperature of the glass ribbons obtained in the forming tin bath is adjusted to 600-660° C., then the glass ribbons are put into a nucleation tin bath for nucleating under 580-640° C. for 30 min-3 h to obtain a primary transitional product;
the secondary transitional heating and then crystallizing specifically is: the temperature of the primary transitional product is adjusted to 740-950° C., then the primary transitional product is put into a crystallization tin bath for crystallizing under 730-940° C. for 2-8.5 h to obtain a secondary transitional product.

9. The glass ceramics according to claim 7, wherein, the forming the molten glass into glass ribbons specifically is: the molten glass after homogenizing and cooling is put into the forming tin bath, and is formed into glass ribbons with a thickness of 2-15 mm under action of an edge puller, an inlet temperature of the forming tin bath is 1250-1320° C., the temperature of the forming tin bath is 750-930° C. when the forming is completed.

* * * * *